United States Patent [19]
Okada

[11] Patent Number: 5,181,441
[45] Date of Patent: Jan. 26, 1993

[54] METHOD FOR SYNCHRONOUSLY INTERLOCKING FEED AXES OF A LATHE

[75] Inventor: Kiyoshi Okada, Aichi, Japan

[73] Assignee: Mitsubishi Denki K.K., Tokyo, Japan

[21] Appl. No.: 725,118

[22] Filed: Jul. 3, 1991

[30] Foreign Application Priority Data

Jul. 5, 1990 [JP] Japan .................. 2-177865

[51] Int. Cl.$^5$ .............................................. B23B 1/00
[52] U.S. Cl. .................................... 82/1.11; 82/118;
82/142; 364/474.17
[58] Field of Search ................ 82/1.11, 118, 142;
364/474.11, 474.17, 474.18

[56] References Cited

U.S. PATENT DOCUMENTS

4,949,444  8/1990  Kojima et al. .................. 82/120

FOREIGN PATENT DOCUMENTS

| 0335659 | 10/1989 | European Pat. Off. |
|---|---|---|
| 0364593 | 4/1990 | European Pat. Off. |
| 8530182 | 6/1990 | Fed. Rep. of Germany |
| 0422651 | 4/1991 | Fed. Rep. of Germany |
| 1228752 | 9/1989 | Japan |
| 109602 | 4/1990 | Japan .................. 82/1.11 |
| 0139101 | 5/1990 | Japan .................. 82/1.11 |
| 1073003 | 2/1984 | U.S.S.R. .................. 82/1.11 |

OTHER PUBLICATIONS

Patent Abstracts of Japan, vol. 13, No. 555, Dec. 11, 1989, JP-A-1 228 752, Sep. 12, 1989.
European Search Report EP 91 11 0184 Apr. 27, 1992.

*Primary Examiner*—Z. R. Bilinsky
*Attorney, Agent, or Firm*—Sughrue, Mion, Zinn, Macpeak & Seas

[57] ABSTRACT

A method for synchronously interlocking feed axes of a lathe is disclosed. In particular, a numerical controller (NC) controls the operation of a lathe by sending position command signals to servo amplifiers. The lathe turns a long workpiece chucked by two opposed headstocks which are driven synchronously. The servo amplifiers send signals to corresponding directional servo motors for moving the headstocks in respective directions. The present invention overcomes the problems of mechanical and workpiece displacement developed as loads on the servo motors by compensating for the positions of the feed axes by means of position offset values determined from the displacement of the machine or workpiece. Specifically, the displacements are detected in accordance with a difference between the torque of the two feed axes to be controlled for synchronous interlocking. In this manner, the displacement of the machine or workpiece is compensated for by moving the headstocks, which are synchronized in the corrected positions.

4 Claims, 8 Drawing Sheets

METHOD FOR SYNCHRONOUSLY INTERLOCKING FEED AXES OF A LATHE

BACKGROUND OF THE INVENTION

1. Field of the Invention

The present invention relates to a method for synchronously interlocking the feed axes of a lathe. More specifically, the present invention relates to a method for synchronously interlocking the feed of the lathe by synchronously interlocking the feed axes of the lathe, wherein the lathe is equipped with first and second feed axes for driving two opposed headstocks.

2. Description of the Prior Art

A lathe is known in the art which turns a long workpiece chucked by two opposed headstocks which are driven synchronously.

FIG. 6 shows a configuration of such a lathe, wherein a tool rest 1 is coupled to a cutting tool 2 and a ballscrew 3 for driving the same. An X-axis servo motor 4, is coupled to the ballscrew 3, for driving the same, and coupled to a workpiece 5 that is to be turned. A chuck 11 for gripping one end of the workpiece 5, a headstock 12 mounted with a spindle, a ballscrew 13 coupled to said headstock 12 for driving the same, and a z-axis servo motor 14 coupled to said ballscrew 13 for driving the same are also shown.

Elements 21 to 24 form a unit identical to elements 11 to 14, respectively, and, therefore, their functions are identical to those discussed above. The prior art lathe causes the workpiece 5 to be gripped at both ends by the headstocks 12, 22 which are then interlocked synchronously to turn the workpiece 5.

FIG. 7 is a block diagram of servo amplifiers in a numerical controller (NC) (not shown) for controlling the lathe shown in FIG. 6. Specifically, an X-axis servo motor 4 for driving the headstock 1, a position sensor 6 for detecting the position of said headstock 1, and a known error counter 7 for detecting the error of a position sensor 6 are shown. A digital-to-analog converter 8 for converting the value of the error counter 7 into an analog value, and a power amplifier 9 for amplifying said analog value and driving the servo motor 4 are also shown.

Elements 16 to 19 and 26 to 29 are individually designed to be of the same configuration as elements 6 to 9 and drive the Z1-axis servo motor 14 and the Z2-axis servo motor 24, respectively.

The X-axis position command pulse Cpx is given by the NC (not shown) for driving servo motor 4. A z-axis position command pulse Cpz is given by the NC for driving the two servo motors 14 and 24, simultaneously.

In FIG. 6, the movements in the X-axis direction of the tool rest 1 and the Z-axis direction of the headstocks 12, 22 are directed by a machining program stored in the NC memory (not shown). In the machining program, the desired movement in the X and Z directions are written for execution on a block basis, e.g.:

N001 G01X100.Z200.F2.;
N002 G00Z-50.;

and operated on by a central processing block (not shown) comprising a CPU, memory, etc., contained in the NC. The desired movement is converted into the position command pulse trains of the corresponding axes by a known pulse distributor.

The position command pulse trains are Cpx and Cpz shown in FIG. 7, wherein Cpx is output for the X axis and Cpz for the Z axis. The position command pulse train Cpx is added to the value of the error counter 7, a difference between that value and the position sensor 6 value is provided to the power amplifier 9 via the digital-to-analog converter 8, which drives the servo motor 4 at a commanded speed in a direction correcting the error value. The tool rest 1 is moved in the X axis direction accordingly.

The position command pulse Cpz is processed in a similar manner. However, because Cpz is given to both error counters 17 and 27, the two headstocks 12 and 22 (FIG. 6) are operated synchronously.

The above prior art method for synchronously interlocking the feed axis might achieve the required turning in ideal environments which are free from such errors as thermal displacement, etc. However, in actual circumstances where the two headstocks 12, 22 are linked by the workpiece 5, mechanical displacement and workpiece displacement develop as loads on the servo motors 14, 24. In addition, these displacements include the pressure displacement of the workpiece due to chucking pressure, the thermal displacement of the workpiece due to heat generated by cutting, and the thermal displacement of the machine due to frictional heat generated during machine movement, etc.; thus, these displacements cannot be eliminated.

FIGS. 8(a) and 8(b) show the machine and workpiece under the influence of displacements, wherein the full lines indicate the machine and workpiece before the displacements develop and the broken lines (5a, 10a) indicate the situation after the displacements have developed.

As can be seen from FIG. 8(a), the displacements are compensated for by a deformed workpiece, which occurs when the rigidity of the workpiece is lower than that of the machine and servo. As shown in FIG. 8(b), the displacements are compensated for by a deformed machine when the rigidity of the machine is lower than those of the workpiece and servo. In addition to FIGS. 8(a) and 8(b), the rigidity of the servo may be lower than those of the workpiece and machine. In this case, the motor torque is saturated to disable control and therefore the overload alarm is activated to stop the motor or drive amplifier. In any of the above instances, excessive force is applied to the workpiece, resulting in reduced turning accuracy.

Accordingly, it is an object of the present invention to overcome the disadvantages in the prior art process by synchronously interlocking the feed axes of a lathe to maintain proper turning accuracy against displacements.

SUMMARY OF THE INVENTION

The present invention is concerned with the method of synchronously interlocking the feed axes of a lathe having first and a second feed axes for driving two opposed headstocks which are linked via a workpiece to achieve synchronous interlocking control of the two feed axes. The present method compensates for the positions of the feed axes by means of position offset values of the feed axes calculated from the displacement of the machine or workpiece. The displacements are detected in accordance with a difference between the torques of the two feed axes to be controlled for synchronous interlocking.

According to the present invention, the displacement of the machine or workpiece is compensated for by moving the headstocks, which are synchronized in the corrected positions unless a new displacement is detected.

DESCRIPTION OF THE PREFERRED EMBODIMENT

Figure 6:
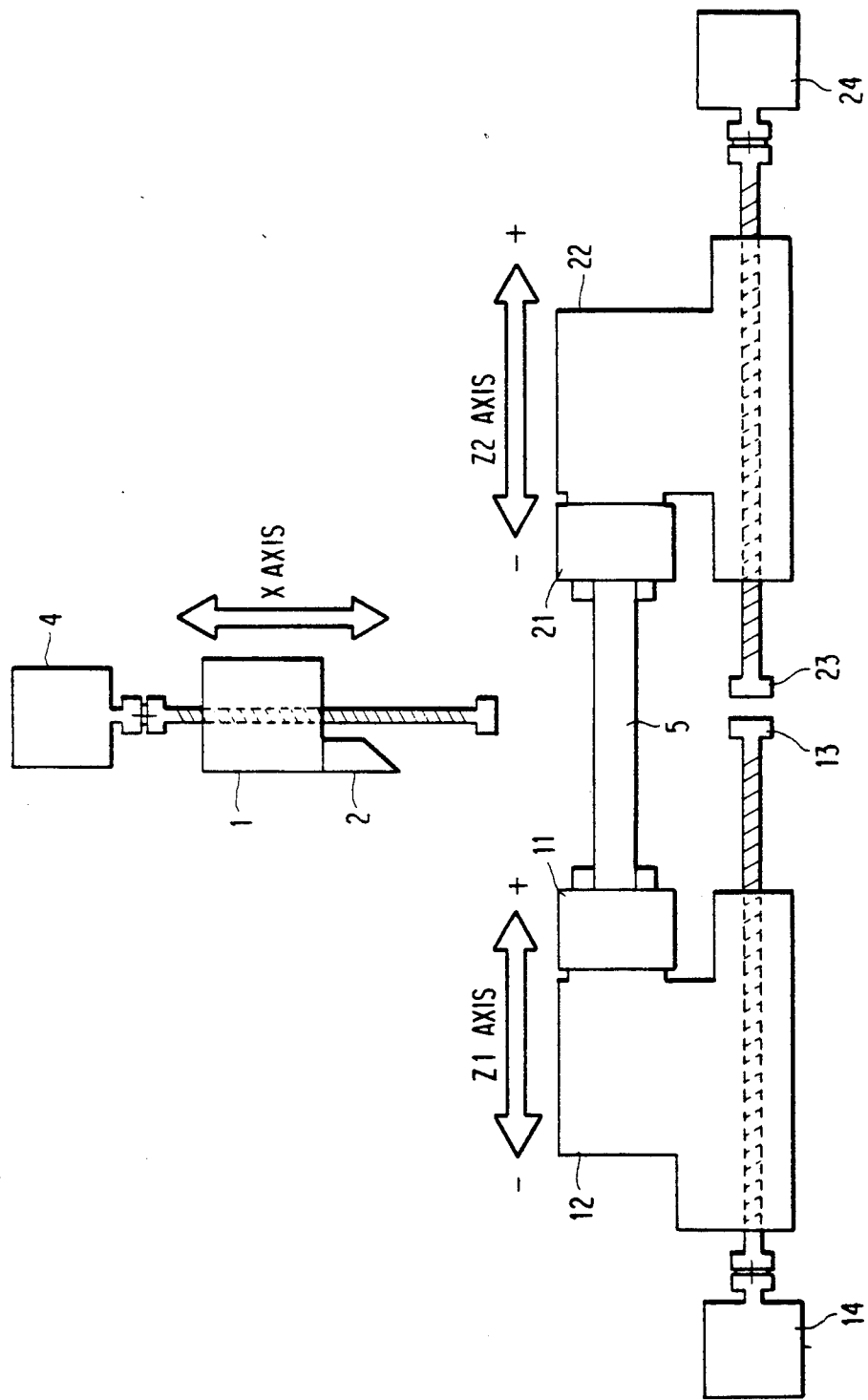
FIG. 6 is a configuration diagram showing a lathe employing a synchronous interlocking operation.

One embodiment of the present invention will now be described with reference to FIGS. 1 and 6.

A machine or workpiece displacement is detected by way of a torque difference detected between the two servo motors controlling the feed axes. This displacement is compensated for by the movement of the headstocks driven from the servo motors by an excess distance corresponding to the detected displacement.

Figure 7:
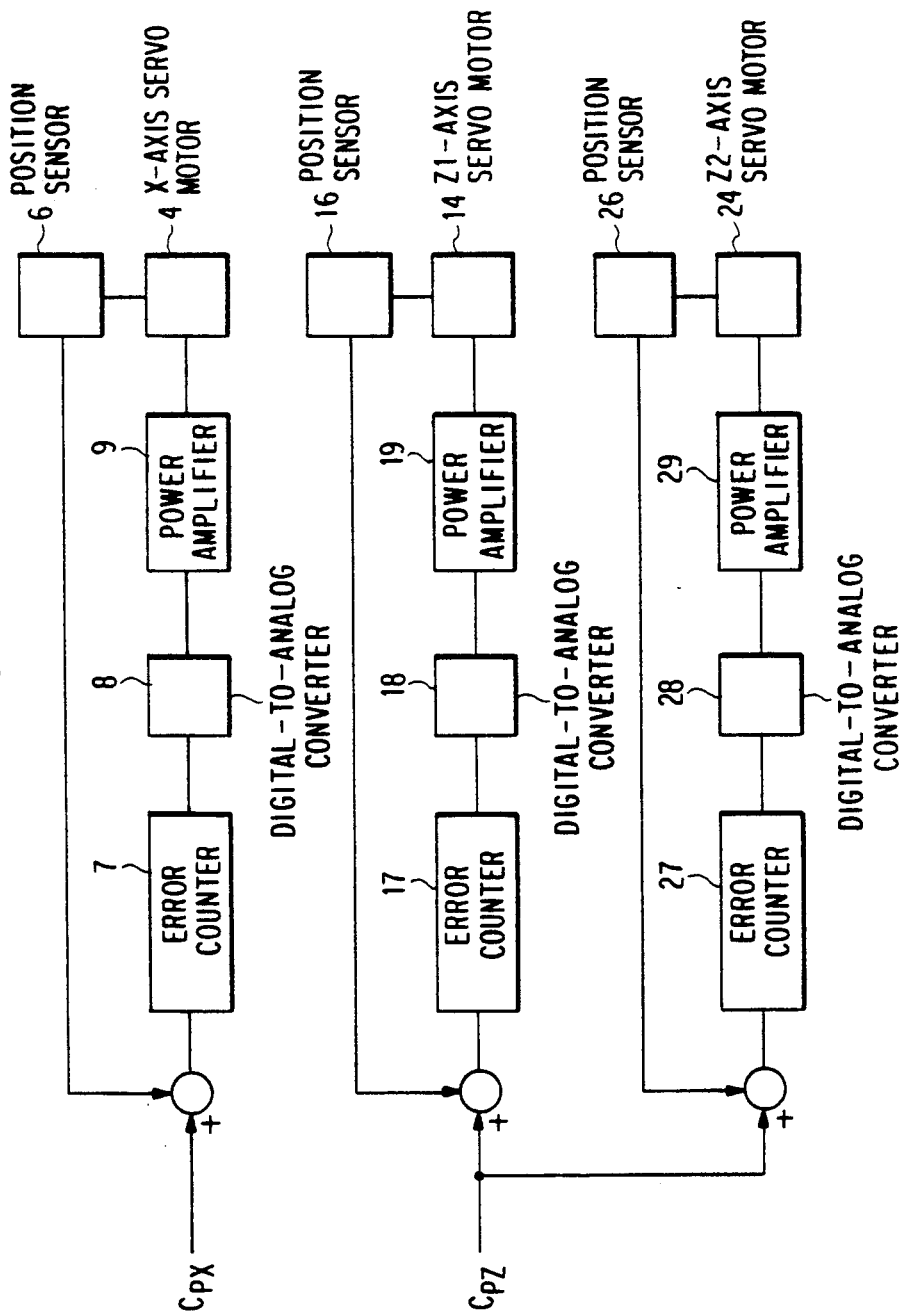
FIG. 7 is a block diagram showing a drive system for achieving the synchronous operation known in the art.

FIG. 5 illustrates the method for which the machine or workpiece displacement can be detected by way of the detected servo motor torques. A graph 40 represents the command pulse Cpz described in FIG. 7 in terms of speed. A torque curve 41 of a master axis shows the change in accordance with the speed command indicated by the graph 40, and torque curve 42 of a slave axis indicates its changes under similar conditions.

Whether the Z1 axis serves as the master or slave axis and the Z2 the other (FIG. 6) depends on how a machining program is written.

As the torque curves 41 and 42 vary in accordance with the same speed command, a difference between them is nearly zero if machine and motor characteristics are almost identical.

Assuming now that the workpiece is elongated relatively by a machine displacement, the headstock 12 (FIG. 6) is pushed in the negative direction and the servo motor 14 generates a positive torque to resist that movement, whereas the opposite headstock 22 is pushed in the positive direction and the servo motor 24 generates a negative torque to resist that movement. Graphs 43 and 44 (FIG. 5) indicate the torque curves of the master and slave axes in this state. A difference 45 between the torque curves 43 and 44, i.e., the torque difference 45 may be assumed to be a torque consumed as a reaction against the action of the machine or workpiece displacement and can be used to detect the machine or workpiece displacement. The magnitude of this torque difference can determine the machine or workpiece displacement.

Figure 1:
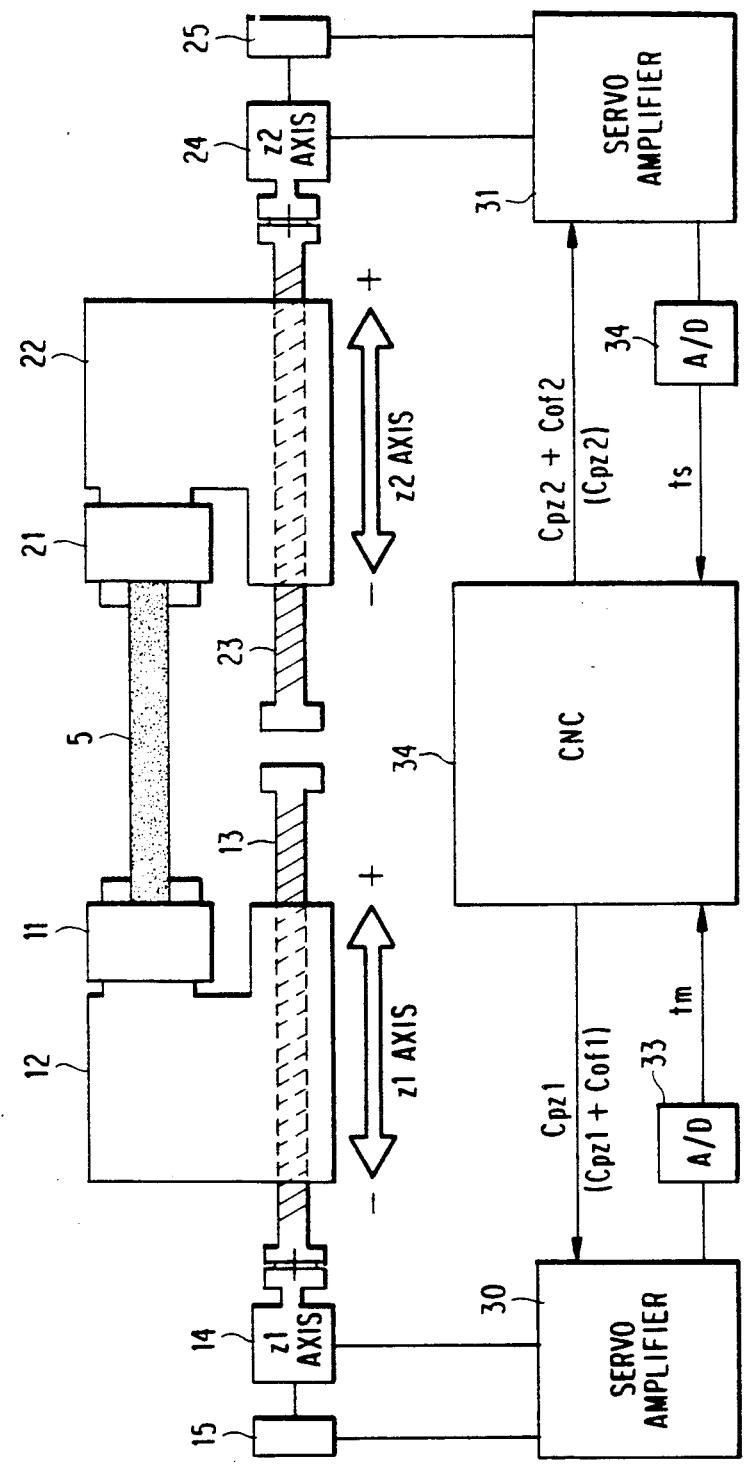
FIG. 1 is an overall block diagram of a lathe in accordance with one embodiment of the present invention.

FIG. 1 shows an embodiment of the present invention, wherein a workpiece 5, which is gripped at both ends by chucks 11 and 21, is coupled to two headstocks 12 and 22, respectively. A ballscrew is coupled to the servo motor 14 for driving the headstock 12, and a ballscrew 23 is coupled to the servo motor 24 for driving the headstock 22 in a similar manner. The servo motor 14 is coupled to a position and speed detecting pulse coder 15 and the servo motor 24 to a position and speed detecting pulse coder 25.

The servo motor 14 is driven by a servo amplifier 30 and the servo motor 24 by a servo amplifier 31. As is known, each of the servo amplifiers 30, 31 comprises a controller having a CPU, memory, etc. and a power amplifier having a power transistor, etc. The controller controls positions and speeds in accordance with feedback signals from the pulse coders 15, 25 and position command data from NC 32.

The NC 32 provides the master axis servo amplifier 30 with position command data Cpz only and provides the slave axis servo amplifier 31 with command data which is the sum of the position command data Cpz and offset position command data Cof.

This relationship is reversed if the machining program has been written to use the servo amplifier 31 as the master axis. Theoretically, this compensation may be made for both the master and slave axes. However, since a workpiece is generally machined using on a coordinate system based with respect to the master axis, it is favorable to compensate the slave axis to ensure high machining accuracy.

The offset position command data Cof is calculated from a torque difference between the servo motors 14 and 24. For this purpose, the currents of the servo motors 14 and 24 are converted into digital values via analog-to-digital converters 33 and 34, respectively, and the results are fed back to the NC 32. These feedback signals are multiplied by an appropriate constant for conversion into units of distance, then differentiated to obtain the variation of distance, and compensated for by defining a delay with an appropriate time constant.

The delay eliminates a temporary torque variation attributable to the fluctuation of drive motor characteristics due to the transient response of the motor and fetches the variation generated constantly. The conversion into units of distance is obtained by the following expression from an error value (E) which, when used provides the maximum rated motor output:

Offset value = E * (feedback torque difference)/(rated torque)

The time constant (T), error value (E) for providing the rated output, and rated torque (tmax) are given as parameters.

Figure 8A:
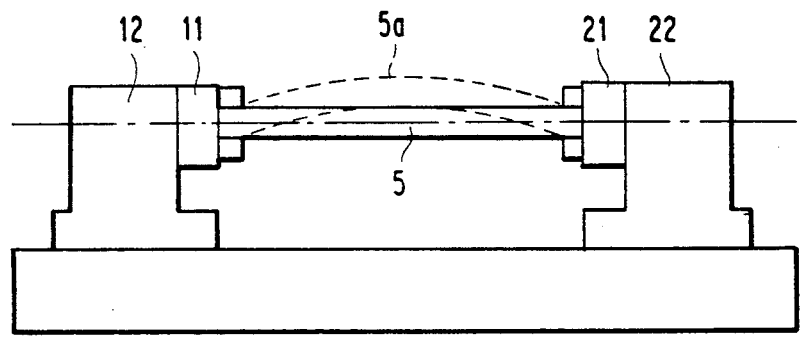
FIGS. 8($a$) and 8($b$) illustrate how the workpiece and machine are distorted by displacements in the known synchronous control.
Figure 8B:
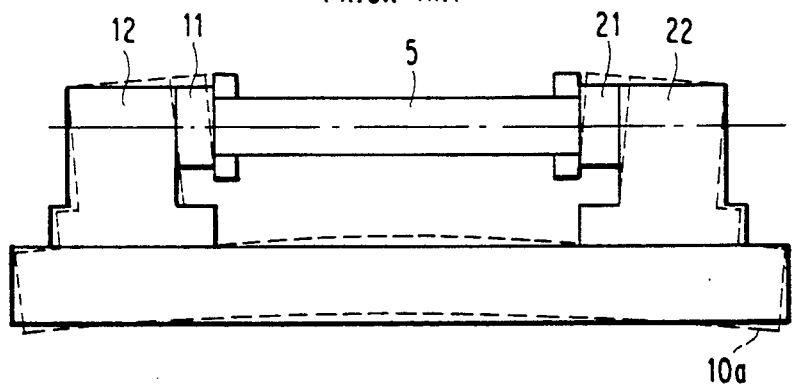

According to the present invention, the occurrence of displacement causes the headstock 22 driven from the servo motor 24 or the headstock 12 driven from the servo motor 14 to move by an excess (compensation) distance corresponding to that displacement. Therefore, the deformation of the workpiece or machine as shown in FIG. 8 will not take place, the headstocks will be synchronized together at the offset positions unless displacement is newly detected, and the servo motors will be driven at the same torque.

Figure 2:
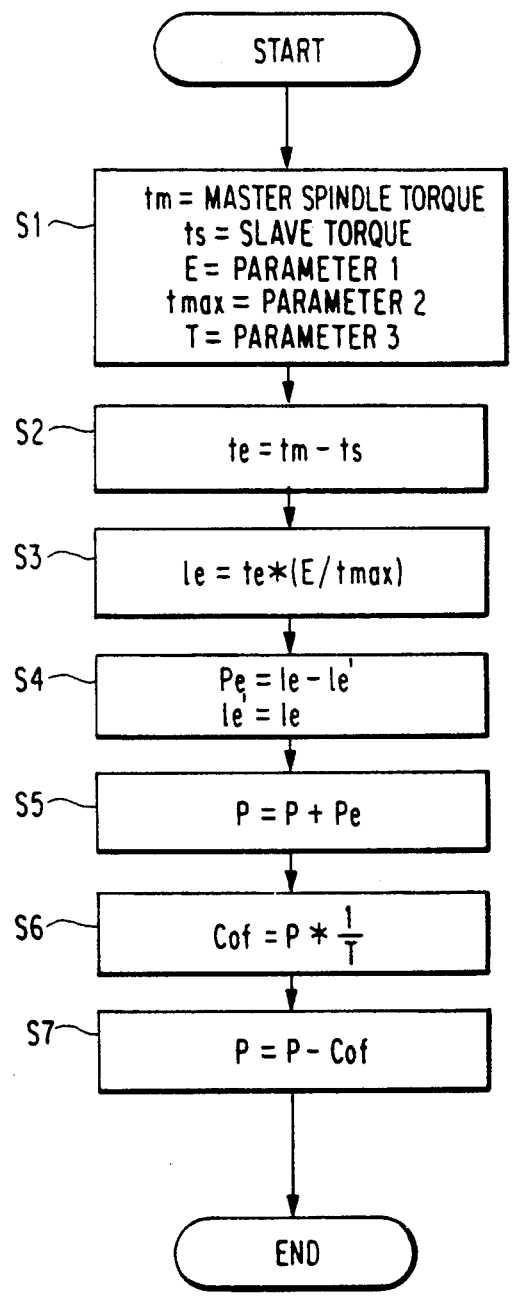
FIG. 2 is a flowchart illustrating the method of obtaining offset values from a torque difference according to the present invention.

FIG. 2 is a flowchart of software processing for finding the offset values from the torque difference. The numeric values following S indicate processing step numbers.

S1: Reads the master axis torque feedback (tm), the slave axis torque feedback (ts), and the set parameter values 1 to 3 (E, tmax, T).

S2: Obtains the torque difference (te) between the master axis torque (tm) and slave axis torque (ts).

S3: Multiplies the torque difference (te) by a constant (E/tmax) to perform dimensional conversion and obtains the distance difference (1e).

S4: Obtains a new offset value (pe) from the difference between the new distance difference (1e) and old distance difference (1e′) and replaces the old distance difference (1e′) with the new distance difference (1e).

S5: Adds the offset value (pe) to the value P obtained by integrating the offset value and replaces P with the result.

S6: Multiplies the integrated offset value (P) by the time constant (1/T) defined in the parameters to obtain the offset value (Cof).

S7: Subtracts the offset value (Cof), output as an actual offset value, from the integrated offset value (P).

Figure 3:
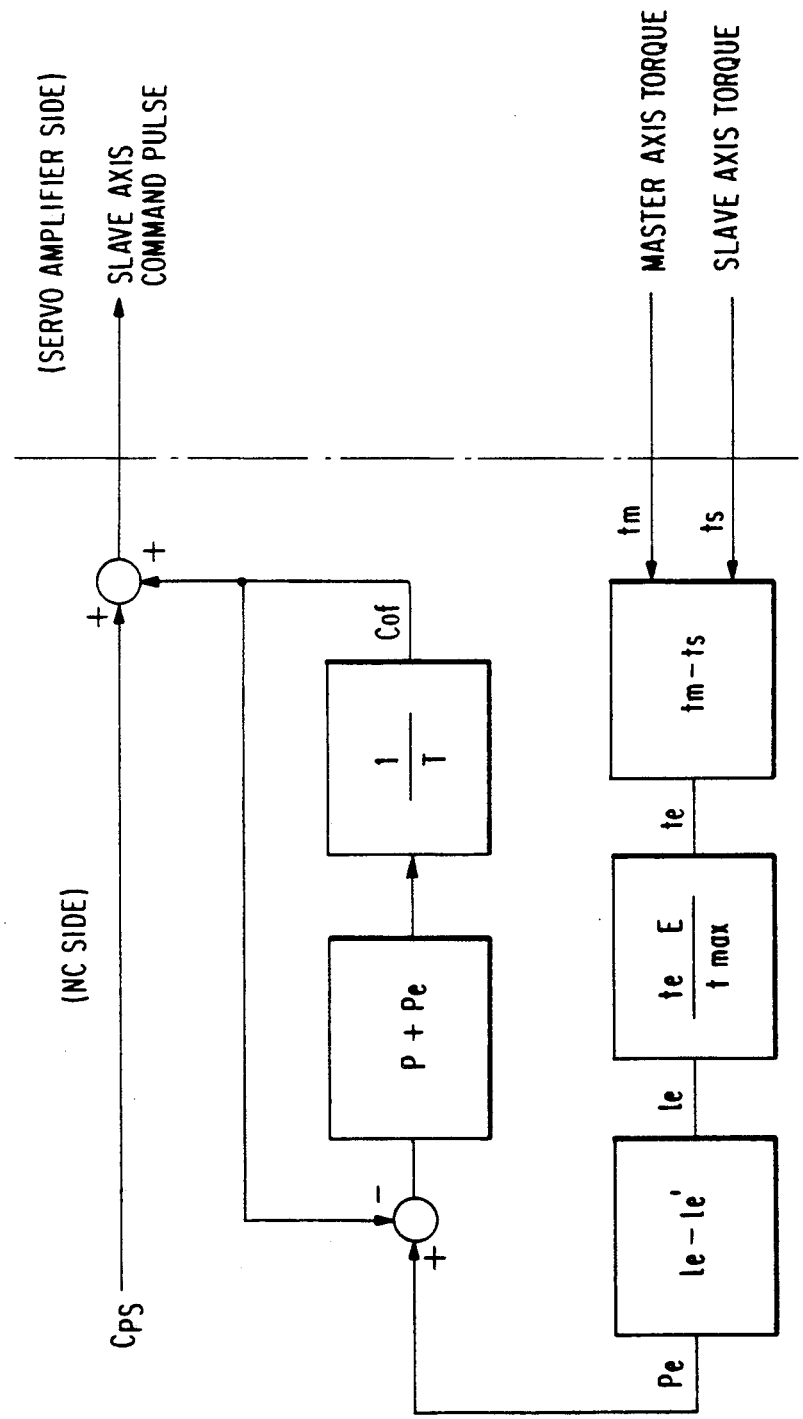
FIG. 3 is a block diagram illustrating the apparatus for implementing the method of FIG. 2.

FIG. 3 is a block diagram of an NC implementing the above S1 to S7 processing steps.

Figure 4:
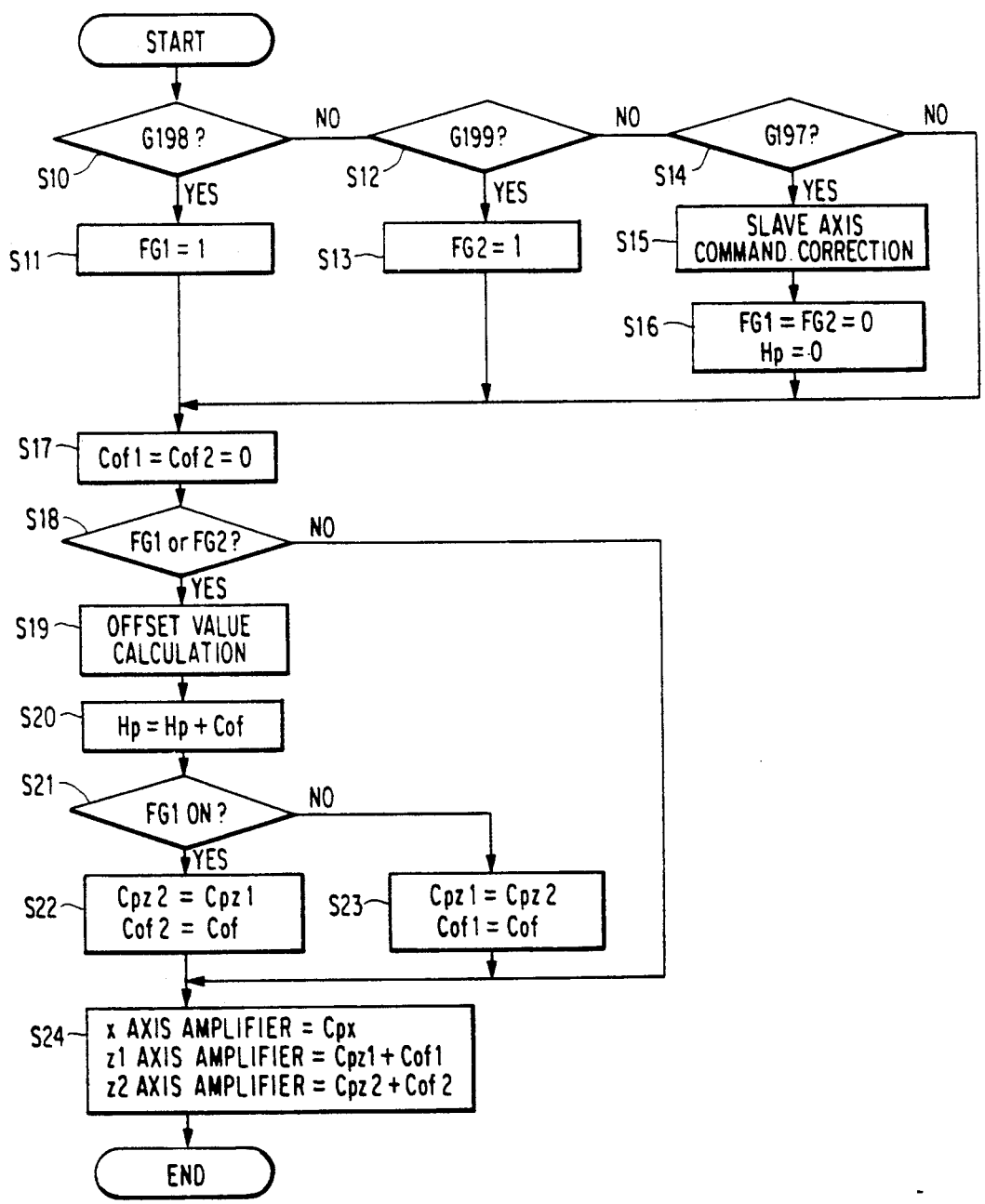
FIG. 4 is a flowchart illustrating the operation of the present invention.
Figure 5A:
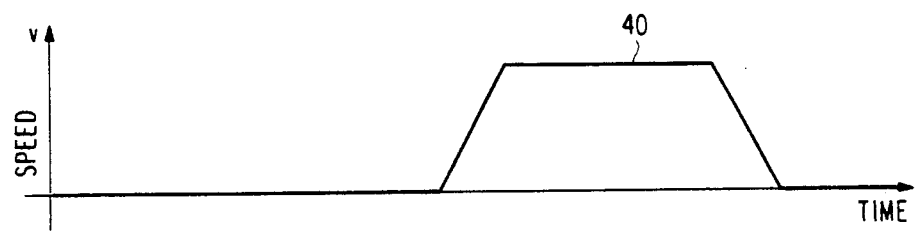
FIG. 5 illustrates torque waveforms of the servo motors according to the present invention.
Figure 5B:
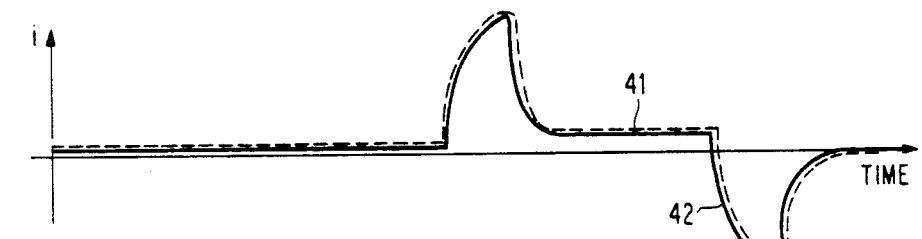
Figure 5C:
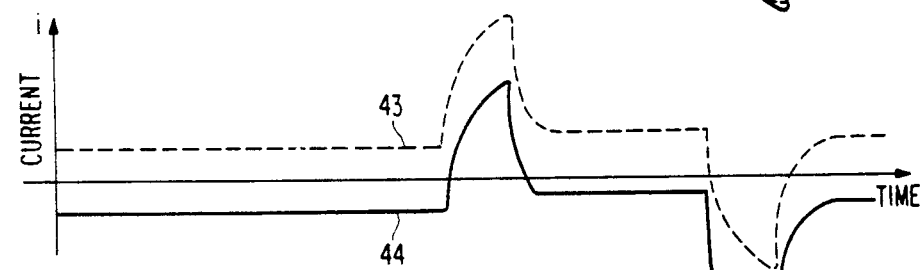
Figure 5D:
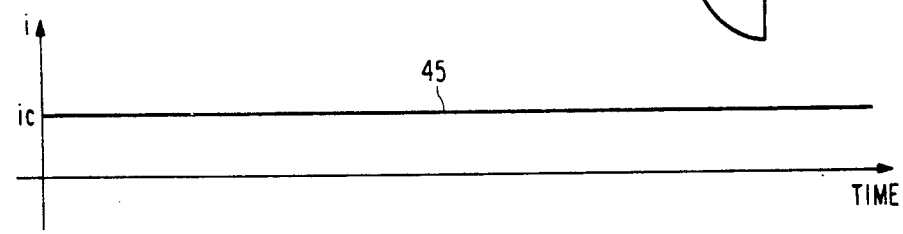

FIG. 4 is a flowchart illustrating the operation of the present invention.

As used in FIG. 4, G198 indicates an interlocking mode command in the machining program which uses the Z1 axis as the master axis; G199, an interlocking mode command in the machining program which employs the Z2 axis as the master axis; and G197, an interlocking mode canceling command in the machining program.

S10: Determines whether the command is G198 or not. If it is G198, switches on a flag (FG1), at S11, which indicates the interlocking mode wherein the Z1 axis is the master axis.

S12: Determines whether command is G199 or not. If it is G199, switches on a flag (FG2), at S13, which indicates the interlocking mode wherein the Z2 axis is the master axis.

S14: Determines whether the command is G197 or not. If it is G197, feeds back the current integrated offset integrated value (calculated at S20) to the command of the slave axis to preset the command value at S15, and clears the interlocking mode flags (FG1, FG2) to cancel the interlocking mode and cancels (zeroes) the integrated value Hp of the offset value at S16.

S17: Initializes the offset value Cof1 of the Z1 axis and the offset value Cof2 of the Z2 axis.

S18: Checks the interlocking mode flags (FG1, FG2). If neither of them indicate the interlocking mode, jumps to S24. If either of them indicates the interlocking mode, performs offset processing from S19 onward.

S19: Calculates the offset value shown in FIG. 2 to obtain the offset value Cof.

S20: Adds the offset value Cof to the offset integrated value Hp and replaces Hp with the result to integrate the offset value obtained at S19.

S21: Determines whether the master axis is the Z1 or Z2 axis.

S22: When the Z1 axis is the master axis, replaces the Z2 axis command data Cpz2 with the master axis command data Cpz1 to employ the Z2 axis as the slave axis, and replaces Cof2 with Cof to add the offset value Cof to the slave axis.

S23: When the Z2 axis is the master axis, replaces the Z1 axis command data Cpz1 with the master axis command data Cpz2 to employ the Z1 axis as the slave axis, and replaces Cof1 with Cof to add the offset value Cof to the slave axis.

S24: Outputs the X axis command pulse Cpx to the X axis servo amplifier, the addition result of the offset pulse Cof1 to the Z1 axis command pulse Cpz1 to the Z1 axis servo amplifier, and the addition result of the offset pulse Cof2 to the Z2 axis command pulse Cpz2 to the Z2 axis servo amplifier.

The error value (E) and rated torque (tmax) for providing the rated output used above to determine the offset value need not be this data but may be certain constants obtained by experiment.

For ease of understanding of the present invention, the above embodiment assumes that the servo motors and servo amplifiers are identical in characteristics, etc. and a failure in synchronous interlocking does not occur due to differences in these characteristics. If there are differences in these characteristics and a failure in synchronous interlocking occurs, synchronization technology disclosed in Japanese Patent Publication No. 228752 of 1989 may be employed for the synchronous control of the servo motors. This publication discloses technology concerned with the lathe covered by the present invention, which calculates offset values of spindle motors from spindle motor torques, rotating positions and speeds if there are differences in motor characteristics, etc. and a failure in synchronous interlocking occurs when the same command is given to two spindle motors, in order to prevent a failure in synchronous interlocking, thereby protecting a workpiece from twist. Namely, the present invention may be used to prevent the reduction of machining accuracy due to displacement, and the spindle synchronism technology disclosed in Japanese Patent Publication No. 228752/1989 may be employed for the synchronous control of the servo motors to prevent the reduction of machining accuracy due to differences in motor characteristics, etc.

It should be noted that any torque difference in excess of a predetermined valve may trigger an alarm without causing compensation. This is because the displacement has become so excessive that the machining accuracy may be adversely affected by the compensating movement of the headstocks.

It will be apparent that the invention, as described above, improves the machining accuracy of a workpiece on a lathe having the performance of two machines in one by preventing any unnecessary load from being applied to the workpiece due to the displacement of the machine or the workpiece itself when one workpiece is gripped simultaneously by two chucks. Since the servo motors are free from unnecessary loads, their power consumption can be reduced, resulting in energy savings. In addition, the machine itself remains free of distortion so that machine accuracy can be guaranteed for a long period of time.

What is claimed is:

1. A method of synchronously interlocking first and second opposing headstocks of a lathe coupled to first and second feed axes of said lathe and linked by a workpiece for performing synchronous interlocking control of said first and second opposing headstocks in accordance with position command data, comprising the steps of:

obtaining a first torque associated with a first motor coupled to said first headstock and a second torque associated with a second motor coupled to said second headstock;

determining offset values of headstock positions attributable to machine or workpiece displacement based only upon a torque difference between said first and said second motors;

converting said torque difference into a distance difference; and compensating for at least one of said position command data of said first and said second opposing headstocks in accordance with said distance difference obtained in said converting step.

2. A method for synchronously interlocking said first and second opposing headstocks of the lathe defined in claim 1, wherein either of said first and said second opposing headstocks coupled to said first and second feed axes is employed as a master headstock, and the other is used as a slave headstock, wherein a slave headstock servo amplifier receives compensated position command data.

3. A method for synchronously interlocking said first and second opposing headstocks of a lathe as defined in claim 1, wherein said first and second opposing headstocks are only compensated for in an interlocking mode and said offset values are canceled when said interlocking mode is reset.

4. A method of compensating for displaced positions of two opposed headstocks in a lathe comprising the steps of:

driving said two opposed headstocks which are linked via a workpiece to achieve synchronous interlocking control of said two opposed headstocks;

determining displacement of positions of said two opposed headstocks based only upon a torque difference between first and second motors associated with said two opposed headstocks, respectively; and moving at least one of said two opposed headstocks to compensate and eliminate said displacement.

* * * * *